United States Patent
Nakamae

(10) Patent No.: US 7,728,061 B2
(45) Date of Patent: Jun. 1, 2010

(54) ADHESIVE COMPOSITION

(75) Inventor: Masato Nakamae, Okayama-ken (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 0 days.

(21) Appl. No.: 12/159,096

(22) PCT Filed: Dec. 19, 2006

(86) PCT No.: PCT/JP2006/325234

§ 371 (c)(1),
(2), (4) Date: Jun. 25, 2008

(87) PCT Pub. No.: WO2007/074674

PCT Pub. Date: Jul. 5, 2007

(65) Prior Publication Data

US 2009/0054579 A1    Feb. 26, 2009

(30) Foreign Application Priority Data

Dec. 27, 2005    (JP) .............................. 2005-373835

(51) Int. Cl.
*C08L 29/04*    (2006.01)
*C08K 3/26*    (2006.01)

(52) U.S. Cl. ...................... 524/503; 524/426

(58) Field of Classification Search ................. 524/503
See application file for complete search history.

(56) References Cited

U.S. PATENT DOCUMENTS 5,308,910 A * 5/1994 Yuki et al. .................. 524/503

2006/0217484 A1 * 9/2006 Tanimoto et al. ............. 524/556

FOREIGN PATENT DOCUMENTS

| JP | 7 157565 | 6/1995 |
|---|---|---|
| JP | 8 259659 | 10/1996 |
| JP | 11 80484 | 3/1999 |
| JP | 11 263849 | 9/1999 |
| JP | 2000 53711 | 2/2000 |
| JP | 2000 109629 | 4/2000 |
| JP | 2001 40098 | 2/2001 |
| JP | 2001 253926 | 9/2001 |
| JP | 2001 342260 | 12/2001 |
| JP | 2002 69198 | 3/2002 |
| JP | 2003 171634 | 6/2003 |
| JP | 2004 211059 | 7/2004 |
| JP | 2005 171065 | 6/2005 |
| JP | 2005 200524 | 7/2005 |

OTHER PUBLICATIONS

U.S. Appl. No. 11/815,219, filed Aug. 1, 2007, Maki, et al.
U.S. Appl. No. 11/994,432, filed Jan. 2, 2008, Nakamae, et al.

* cited by examiner

*Primary Examiner*—Ling-Siu Choi
*Assistant Examiner*—Hui Chin
(74) *Attorney, Agent, or Firm*—Oblon, Spivak, McClelland, Maier & Neustadt, L.L.P.

(57) ABSTRACT

To provide an adhesive composition which is easily transported and stored, is remarkably excellent in redispersibility in water at a site where it is used and exhibits high performance as an adhesive agent or a coating agent. The above problem is solved by an adhesive composition composed of a synthetic resin powder (A) obtained by drying an aqueous emulsion (EM) containing a polyvinyl alcohol polymer (PVA-1) as a dispersant and a polymer having at least one monomer unit selected from the group consisting of ethylenically unsaturated monomers and diene monomers as a dispersoid, an inorganic powder (B) and a polyvalent isocyanate compound, wherein (A)/(B) is to 100/250.

12 Claims, No Drawings

ADHESIVE COMPOSITION

TECHNICAL FIELD

The present invention relates to an adhesive composition. More particularly, the present invention relates to an adhesive composition composed of a synthetic resin powder obtained by drying a composition combining a polyvinyl alcohol polymer in an aqueous emulsion containing a polyvinyl alcohol polymer as a dispersant and a polymer having at least one monomer unit selected from ethylenically unsaturated monomers and diene monomers as a dispersoid, an inorganic powder and a polyvalent isocyanate compound. The adhesive composition of the present invention is excellent in handling property and storage stability as well as having a high water resistant adhesiveness, and thus is preferably used for an adhesive agent or a coating agent.

BACKGROUND ART

Conventionally, an aqueous polymer compound/isocyanate based adhesive agent (EPI system) has been widely used for adhesive agents, paints (coating agents) and the like by taking advantage of its high water resistance. As a method for preparing it, the method of using as a base compound a water dispersible composition obtained by dissolving a polyvinyl alcohol powder in water with heating, adding an inorganic powder, an organic powder or an aqueous emulsion at predetermined ratios thereto and dispersing the mixture by mixing and stirring has been employed. Hereinafter, polyvinyl alcohol is simply abbreviated as PVA.

However, since the adhesive agent using the above water dispersible composition as the base compound is in a form of a water dispersion, there are problems of thickening, freezing and gelling in a land of severe cold during the winter and special measures such as temperature management are required for transport and storage. For disposal of reservoirs such as containers and metal drums for the aqueous compositions, the cost for collecting these cannot be ignored in a trend of making waste disposal suitable in the context of recent environmental concerns.

Therefore, an adhesive agent and a coating agent with high performance composed mainly of a powder composition have been requested in terms of easy transport and storage and having the capability of using containers such as paper bags and flexible container bags for easy disposal. Until now, as a powder type composition suitable for such a request, one powder type composition obtained by mixing inorganic powder or organic powder at a predetermined ratio with PVA powder, and one powder type composition obtained by mixing powder additives such as re-emulsified type powder emulsion have been proposed (Patent Document 1).

Patent Document 1: JP Hei-11-80484-A

However, when this powder type composition is re-dissolved (redispersed) in water at a site where it is used, it is forced to be dissolved (dispersed) incompletely due to crystallinity and insoluble (non-dispersible) piece formation of the PVA powder, and it has been pointed out that the insoluble (non-dispersible) pieces inhibit fluidity, adhesiveness and cohesiveness of the adhesive agents and coating agents.

On the other hand, a mixed powder composed of synthetic resin powder obtained by adding a PVA based polymer to an aqueous emulsion obtained from a dispersant and a dispersoid and drying the mixture and inorganic powder is known, and it has been described that the mixed powder is excellent in redispersibility, water resistance, film forming property when redispersed, and stability when left to stand at low temperature (Patent Document 2).

Patent Document 2: JP 2004-131719-A

DISCLOSURE OF INVENTION

Problems to be Solved by the Invention

However, it is an actual circumstance that an adhesive composition which is easily transported and stored and further exhibits performance excellent in redispersibility in water and adhesiveness is requested. Therefore, it is an object of the present invention to provide an adhesive composition which is easily transported and stored, is remarkably excellent in redispersibility in water at a site where it is used and exhibits high performance as an adhesive agent or a coating agent.

Means for Solving Problem

To accomplish the above object, the present inventor has through extensive research by focusing on an adhesive composition composed of a synthetic resin powder obtained by drying an aqueous emulsion (EM) containing a polyvinyl alcohol polymer (PVA-1) as a dispersant and a polymer having at least one monomer unit selected from ethylenically unsaturated monomers and diene monomers as a dispersoid, an inorganic powder and a polyvalent isocyanate compound, found that the above object can be accomplished by the composition where (A)/(B) satisfies a particular range, and completed the present invention.

That is, the present invention is the adhesive composition composed of the synthetic resin powder obtained by drying the aqueous emulsion (EM) containing the polyvinyl alcohol polymer (PVA-1) as the dispersant and the polymer having at least one monomer unit selected from ethylenically unsaturated monomers and diene monomers as the dispersoid, the inorganic powder and the polyvalent isocyanate compound and characterized in that (A)/(B) is 100/50 to 100/250.

Effects of the Invention

According to the present invention, it is possible to provide the adhesive composition which is easily transported and stored, is remarkably excellent in redispersibility in water at a site where it is used and exhibits high performance as an adhesive agent or a coating agent.

BEST MODES FOR CARRYING OUT THE INVENTION

The adhesive composition of the present invention can be obtained by producing an aqueous emulsion from the dispersant and the dispersoid, mixing a synthetic resin powder obtained by drying the emulsion and an inorganic powder and further combining a polyvalent isocyanate compound. First, the PVA based polymer (PVA-1), which is the dispersant, will be described.

The PVA based polymer (PVA-1) which is the dispersant for obtaining the aqueous emulsion (EM) can be obtained by saponifying a vinyl ester based polymer obtained by polymerizing a vinyl based monomer composed mainly of a vinyl ester based monomer by methods known conventionally and publicly using standard methods. Any vinyl ester monomer which is radical-polymerizable can be used, and vinyl formate, vinyl acetate, vinyl propionate, vinyl valerate, vinyl caprate, vinyl laurate, vinyl stearate, vinyl benzoate, and vinyl pivalate can be exemplified. Among these, vinyl acetate is preferable.

A viscosity average polymerization degree (hereinafter referred to as a polymerization degree) and a saponification degree of the PVA based polymer (PVA-1) are not particularly limited as long as they do not inhibit the object of the present invention. In general, the polymerization degree is 100 to 8,000 and the saponification degree is 40 to 99.9 mol %. The PVA based polymer (PVA-1) may be modified variously in the range in which the object of the present invention is not inhibited. As the PVA based polymer (PVA-1), unmodified PVA having a polymerization degree of 200 to 2,000 and a saponification degree of 80 to 96 mol %, the PVA based polymer having a carboxyl group, the PVA based polymer having 10 mol % or less of the monomer unit derived from α-olefin having 2 to 4 carbon atoms, the PVA based polymer having 1.7 mol % or more of 1,2-glycol linkage in a molecule or the PVA based polymer having a mercapto group at a terminus is preferably used in terms of performance such as redispersibility and adhesiveness in water. These are typically used alone, but may be used in combination of two or more.

Hereinafter, as the PVA based polymer (PVA-1), 1) the case of using unmodified PVA, 2) the case of using the PVA based polymer having the carboxyl group, 3) the case of using the PVA based polymer having 10 mol % or less of the monomer unit derived from α-olefin having 2 to 4 carbon atoms, 4) the case of using the PVA based polymer having 1.7 mol % or more of 1,2-glycol linkage in the molecule, and 5) the case of using the PVA based polymer having the mercapto group at the terminus will be described in more detail.

1) In the case of using unmodified PVA as the PVA based polymer (PVA-1), when the polymerization degree is too small, a mechanical strength is sometimes reduced when the adhesive composition is used as the adhesive agent or coating agent, and if it is too large, the polymer is sometimes adhered to a dryer when powderized by drying. Thus the polymerization degree is preferably 200 to 2,000. The saponification degree is preferably 80 to 96 mol %. If they are out of this range, the stability of the aqueous emulsion and the redispersibility of the powder composition in water are sometimes reduced. The polymerization degree and the saponification degree are more preferably 300 to 1,800 and 85 to 95 mol %, respectively.

2) In the case of using the PVA based polymer having the carboxyl group as the PVA based polymer (PVA-1), the PVA based polymer can be obtained by various methods, and generally, can be obtained by copolymerizing a compound containing the carboxyl group such as fumaric acid, maleic acid, itaconic acid, maleic acid anhydrate, phthalic acid anhydrate, trimellitic acid anhydrate or itaconic acid anhydrate or ester thereof with vinyl ester such as vinyl acetate by the method known conventionally and publicly and saponifying the copolymer. An amount of the modified carboxyl group, the polymerization degree and the saponification degree are not particularly limited as long as they do not impair the effect of the present invention. Considering a balance of physical properties e.g., the stability of the aqueous emulsion, the redispersibility of the powder composition in water and the adhesiveness at high level, it is desirable that the amount of the modified carboxyl group is 3 mol % or less, the polymerization degree is 200 to 2,000 and the saponification degree is 70 to 99 mol %.

3) In the case of using the PVA based polymer having 10 mol % or less of the monomer unit derived from α-olefin having 2 to 4 carbon atoms as the PVA based polymer (PVA-1), the PVA based polymer can be obtained by copolymerizing ethylene, propylene, 1-butene or isobutene with vinyl ester such as vinyl acetate by the method known conventionally and publicly and saponifying the copolymer. As α-olefin, ethylene is preferable in terms of exhibiting the effect. The amount of the modified monomer unit derived from α-olefin is more preferably 8 mol % or less because when the amount is too large, the stability of the aqueous emulsion and the redispersibility of the powder composition in water are sometimes reduced. The polymerization degree and the saponification degree vary depending on the amount of modified α-olefin, and are preferably 200 to 2,000 and 85 to 95 mol %, respectively in terms of physical properties such as stability of the aqueous emulsion, redispersibility of the powder composition in water and adhesiveness.

4) In the case of using the PVA based polymer having 1.7 mol % or more of 1,2-glycol linkage in the molecule as the PVA based polymer (PVA-1), the method for producing the PVA based polymer is not particularly limited and a publicly known method can be used. For example, the method of copolymerizing vinylene carbonate with vinyl ester such as vinyl acetate so that the above amount of the 1,2-glycol linkage is obtained and saponifying it, and the method of polymerizing vinyl ester at a temperature such as 75 to 200° C. which is higher than a normal polymerization temperature under pressure and saponifying it can be included. In the latter method, the polymerization temperature is preferably 95 to 190° C. and more preferably 100 to 180° C. As a pressurization condition, it is important to select a pressure so that the temperature in the polymerization system is equal to or lower than a boiling point, and the pressure is preferably 0.2 MPa or more and more preferably 0.3 MPa or more. An upper limit of the pressure is preferably MPa or less and more preferably 3 MPa or less.

When the amount of the 1,2-glycol linkage is larger, the effect of the present invention is more remarkably expressed in terms of stability of the aqueous emulsion and redispersibility of the powder composition in water. Thus, the amount of the 1,2-glycol linkage is preferably 1.7 mol % or more and more preferably 1.9 mol % or more. A suitable polymerization degree and saponification degree are preferably 200 to 2,000 and 80 to 99 mol %, respectively in terms of physical properties e.g., the stability of the aqueous emulsion, the redispersibility of the powder composition in water and the adhesiveness.

5) In the case of using the PVA based polymer having the mercapto group at the terminus as the PVA based polymer (PVA-1), the method for producing the PVA based polymer is not particularly limited. For example, the PVA based polymer can be produced by polymerizing vinyl ester such as vinyl acetate in the presence of thioacetic acid and saponifying it by the standard method. The polymerization degree and the saponification degree vary depending on the content of the mercapto group, and are preferably 200 to 1,700 and 85 to 96 mol %, respectively in terms of physical properties e.g., the stability of the aqueous emulsion, the redispersibility of the powder composition in water and the adhesiveness.

In the PVA based polymer (PVA-1), a copolymerizable monomer as a third component may be copolymerized in the range in which the performance of the present invention is not impaired. The copolymerizable monomer can include, for example, olefins such as ethylene, propylene, 1-butene and isobutene, acrylic acid, acrylate esters such as methyl acrylate, ethyl acrylate, n-propyl acrylate, i-propyl acrylate, n-butyl acrylate, t-butyl acrylate, 2-ethylhexyl acrylate, dodecyl acrylate and octadecyl acrylate, methacrylic acid, methacrylate esters such as methyl methacrylate, ethyl methacrylate, n-propyl methacrylate, i-propyl methacrylate, n-butyl methacrylate, t-butyl methacrylate, 2-ethylhexyl methacrylate, dodecyl methacrylate and octadecyl methacrylate, vinyl ethers such as methyl vinyl ether, n-propyl vinyl ether, i-propyl vinyl ether, n-butyl vinyl ether, i-butyl vinyl ether, t-butyl vinyl ether, dodecyl vinyl ether and stearyl vinyl ether, nitriles such as acrylonitrile and methacrylonitrile, halogenated vinyls such as vinyl chloride, vinylidene chloride, vinyl fluoride and vinylidene fluoride, allyl compounds such as allyl acetate and allyl chloride, compounds containing the carboxyl group such as fumaric acid, maleic acid, itaconic acid, maleic acid anhydrate, phthalic acid anhydrate, trimellitic acid anhydrate and itaconic acid anhydrate and ester thereof, sulfonate group-containing compounds such as ethylene sulfonate, allyl sulfonate, methallyl sulfonate and 2-acrylamide-2-methylpropane sulfonate, vinyl silane compounds such as vinyl trimethoxysilane, isopropenyl acetate, 3-acrylamidepropylyrimethylammonium chloride and 3-methacrylamidepropyltrimethylammoniumchloride. These may be used alone or in combination of two or more, but it is preferable that they be used at 5 mol % or less.

Subsequently, the dispersoid for obtaining the aqueous emulsion (EM) will be described. As such a dispersoid, a polymer having at least one monomer unit selected from the group consisting of ethylenically unsaturated monomers and diene monomers is used. The aqueous emulsion (EM) of the present invention is obtained by using the polyvinyl alcohol polymer (PVA-1) as the dispersant and emulsion polymerizing one or more monomers selected from the above ethylenically unsaturated monomers and diene monomers.

The ethylenically unsaturated monomer can include olefins such as ethylene, propylene and isobutene, halogenated olefins such as vinyl chloride, vinylidene chloride, vinyl fluoride and vinylidene fluoride, vinyl esters such as vinyl formate, vinyl acetate, vinyl propionate, vinyl versatate and vinyl pivalate, acrylic acid, acrylate esters such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate and octadecyl acrylate, methacrylic acid, methacrylate esters such as methyl methacrylate, ethyl methacrylate, n-propyl methacrylate, i-propyl methacrylate, n-butyl methacrylate, i-butyl methacrylate, t-butylmethacrylate, 2-ethylhexylmethacrylate, dodecyl methacrylate and octadecyl methacrylate, nitriles such as acrylonitrile and methacrylonitrile, allyl compounds such as allyl acetate and allyl chloride, styrene based monomers such as styrene, α-methylstyrene, p-methylstyrene sulfonate and sodium or potassium salts thereof, trimethyl-(3-acrylamide-3-dimethylpropyl)-ammonium chloride, 3-acrylamidepropyltrimethylammonium chloride, 3-methacrylamidepropyltrimethylammonium chloride, quaternary ammonium salt of N-(3-allyloxy-2-hydroxypropyl)dimethylamine, quaternary ammonium salt of N-(4-allyloxy-3-hydroxybutyl)diethylamine, further acrylamide and methacrylamide derivatives such as acrylamide, N-methylacrylamide, N-ethylacrylamide, N,N-dimethylacrylamide, diacetone acrylamide, methacrylamide, N-methylmethacrylamide and N-ethylmethacrylamide, methacrylic acid hydroxypropyltrimethylammonium chloride, acrylic acid hydroxypropyltrimethylammonium chloride and N-vinyl pyrrolidone. The diene monomer can include butadiene, isoprene and chloroprene. These monomers are used alone or in combination of two or more.

The aqueous emulsion (EM) can be obtained by emulsion polymerizing at least one monomer selected from the group consisting of the above ethylenically unsaturated monomers and diene monomers in the presence of the PVA based polymer (PVA-1) which is the dispersant. As a polymerization initiator when the emulsion polymerization is performed, the polymerization initiator typically used for the emulsion polymerization, i.e., the water soluble initiator such as potassium persulfate, ammonium persulfate, hydrogen peroxide and t-butylhydroperoxide and the oil soluble initiator such as azobisisobutyronitrile and benzoyl peroxide are used alone or in a redox system combining various reducing agents. The method of using them is not particularly limited, and the method of adding all at once at an early phase and the method of continuously adding to the polymerization system can be employed.

The amount of the PVA based polymer (PVA-1) to be used is not particularly limited. When the amount is too small, the polymerization stability of the emulsion is reduced, and when it is too large, problems, e.g., the removal of reaction heat due to viscosity increase in the polymerization system and the adhesion when the powder composition of the present invention is obtained by drying sometimes occur. Thus, the amount of the PVA based polymer to be used is 2 to 30 parts by weight, preferably 3 to 15 parts by weight and more preferably 3 to 10 parts by weight relative to 100 parts by weight of the monomer which composes the emulsion (EM).

The method of adding the PVA based polymer (PVA-1) is not particularly limited. The method of adding all at once at the early phase and the method of adding a part of the PVA based polymer at the early phase and then adding continuously to the polymerization system during polymerization are employed. Conventionally and publicly known nonionic, anionic, cationic and ampholytic surfactants, and water soluble polymers such as hydroxyethylcellulose may be combined with the vinyl alcohol polymer.

The above monomer which undergoes the emulsion polymerization to become the dispersoid may be added by adding to the polymerization system all at once at the early phase or by adding a part of the monomer at the early phase and then adding the remainder continuously during polymerization. Those obtained by previously emulsifying the monomer, the water and the dispersant may also be added continuously to the polymerization system.

The aqueous emulsion (EM) in the present invention is preferably the emulsion obtained by the emulsion polymerization of the monomer containing the monomer having a primary hydroxyl group. The monomer having such a primary hydroxyl group includes, for example, 2-hydroxyethyl acrylate, 2-hydroxyethyl methacrylate, caprolactone modified acrylate ester, caprolactone modified methacrylate ester, the monomer unit derivatized from N-alkylolamides (N-methylol acrylamide, N-ethanol acrylamide, N-propanol acrylamide, N-methylol methacrylamide, N-ethanol methacrylamide, N-methanol maleamide) of α,β-ethylenically unsaturated carboxylic acid having 3 to 10 carbon atoms. Furthermore, when the ethylenically unsaturated monomer unit having the primary hydroxyl group, e.g., the monomer unit derivatized from allyl alcohol is used, it is possible to introduce the primary hydroxyl group which is effectively crosslinked with a polyvalent isocyanate compound described later in the aqueous emulsion. This is preferable because the performance such as adhesiveness is remarkably enhanced. It is preferable to use this at 5% by weight or less based on the total monomers.

A chain transfer agent can also be added when the aqueous emulsion (EM) is produced. The chain transfer agent is not particularly limited as long as a chain transfer occurs. The compound having the mercapto group is preferable in terms of efficiency of the chain transfer. The compound having the mercapto group includes alkyl mercaptan such as n-octylmercaptan, n-dodecylmercaptan and t-dodecylmercaptan, 2-mercaptoethanol and 3-mercaptopropion acid. When the amount of the chain transfer agent is too large, the polymerization stability of the aqueous emulsion is reduced, further a molecular weight of the polymer which forms the dispersoid is remarkably reduced and the physical properties such as adhesiveness of the present invention are sometimes reduced. Thus, the amount of the chain transfer agent is preferably 5 parts by weight or less relative to 100 parts by weight of the monomer.

The adhesive composition of the present invention is composed of the synthetic resin powder (A) obtained by drying the aqueous emulsion (EM) obtained as the above, the inorganic powder (B) and the isocyanate compound. As the synthetic resin powder, it is preferable in terms of redispersibility in water to use the synthetic resin powder obtained by drying the composition in which the PVA based polymer (PVA-2) has been combined with the aqueous emulsion (EM). The PVA based polymer (PVA-2) is obtained by saponifying a vinyl ester based polymer obtained by polymerizing the vinyl based monomer composed mainly of the vinyl ester monomer by the method known conventionally and publicly using the standard method as is the case with the PVA based polymer (PVA-1). It is preferable in terms of the above that the amount of the PVA based polymer (PVA-2) is 1 to 25 parts by weight relative to 100 parts by weight of a solid content of the aqueous emulsion (EM).

As the vinyl ester monomer, those which are radical-polymerizable can be used, and for example, vinyl formate, vinyl acetate, vinyl propionate, vinyl valerate, vinyl caprate, vinyl laurate, vinyl stearate, vinyl benzoate, and vinyl pivalate can be included. Among them, vinyl acetate is preferable.

The polymerization degree and the saponification degree of the PVA based polymer (PVA-2) is not particularly limited like the PVA based polymer (PVA-1) described as long as it does not impair the object of the present invention, and in general, the polymerization degree and the saponification degree are 100 to 8,000 and 40 to 99.9 mol %, respectively. Various modifications are not particularly limited in the range in which the object of the present invention is not impaired. As the PVA based polymer (PVA-2), unmodified polyvinyl alcohol having the polymerization degree of 200 to 2,000 and the saponification degree of 80 to 96 mol %, the polyvinyl alcohol polymer having the carboxyl group, the PVA based polymer having 10 mol % or less of the monomer unit derived from α-olefin having 2 to 4 carbon atoms and the PVA based polymer having 1.7 mol % or more of 1,2-glycol linkage in the molecule are preferable in terms of performance such as redispersibility of the powder composition in water and adhesiveness. These are typically used alone, but may be used in combination of two or more.

The PVA based polymer (PVA-2) includes unmodified PVA having the polymerization degree of 200 to 2,000 and the saponification degree of 80 to 96 mol %, the PVA based polymer having the carboxyl group, the PVA based polymer having 10 mol % or less of the monomer unit derived from α-olefin having 2 to 4 carbon atoms and the PVA based polymer having 1.7 mol % or more of 1,2-glycol linkage in the molecule. These are the same as those described for the PVA based polymer (PVA-1). Thus, a detailed description is omitted.

The adhesive composition of the present invention is composed of the synthetic resin powder (A) obtained by drying the composition obtained by preferably combining the PVA based polymer (PVA-2) with the aqueous emulsion (EM), the inorganic powder (B) and the polyvalent isocyanate compound, and it is necessary that the ratio of the synthetic resin powder (A) to the inorganic powder (B) [(A)/(B)] is 100/50 to 100/250. When the ratio of the inorganic powder (B) to the synthetic resin powder (A) is too large, the dispersibility of the inorganic powder in water worsens, an adhesive agent layer hardens and becomes fragile. Thus, this is problematic in terms of adhesive force. When the ratio of the inorganic powder (B) to the synthetic resin powder (A) is too small, a blocking prevention effect of the synthetic resin powder (A) and a mechanical strength improving effect of the adhesive agent layer become insufficient. In this way, the adhesive composition of the present invention is composed of the combination of the synthetic resin powder (A) obtained by drying the composition obtained by preferably combining the PVA based polymer (PVA-2) with the aqueous emulsion (EM), the inorganic powder (B) and the polyvalent isocyanate compound, and it is the largest feature that the redispersibility in water, the blocking prevention and an adhesive agent layer strength can be realized at high levels by further making the ratio of the inorganic powder (B) to the synthetic resin powder (A) relatively high.

Various additives can be added to the composition composed mainly of the aqueous emulsion (EM) and the PVA based polymer (PVA-2) in the range in which the performance is not impaired. The additives include hydroxyethylcellulose, methylcellulose, starch derivatives, polyvinyl pyrrolidone, polyethylene oxide, and additionally water soluble polymers such as water soluble alkyd resins, water soluble phenol resins, water soluble urea resins, water soluble melamine resins, water soluble naphthalene sulfonate resins, water soluble amino resins, water soluble polyamide resins, water soluble acryl reins, water soluble polycarboxylic acid resins, water soluble polyester resins, water soluble polyurethane resins, water soluble polyol resins and water soluble epoxy resins, anionic, cationic and nonionic surfactants known conventionally and publicly, various anti-foams, various preservatives, and inorganic powders of silica and calcium carbonate.

The synthetic resin powder (A) is obtained by drying the composition composed mainly of the aqueous emulsion (EM) and the PVA based polymer (PVA-2). To obtain this composition, the method of preparing by adding the aqueous solution of the PVA based polymer (PVA-2) to the emulsion (EM) and mixing them is suitable, but the method of adding powder, flakes or pellets of the PVA based polymer (PVA-2) to the emulsion (EM) may be employed. When the emulsion (EM) is produced by the emulsion polymerization, all of the PVA based polymer (PVA-2) may be added at once or the PVA based polymer (PVA-2) may be added continuously in a latter half of the emulsion polymerization.

In the present invention, as the PVA based polymer (PVA-1) and/or the PVA based polymer (PVA-2), the use of the PVA based polymer having 1.7 mol % or more of 1,2-glycol linkage in the molecule is preferable because the effect is remarkably exhibited. It is more preferable to use the PVA based polymer having 1.7 mol % or more of 1,2-glycol linkage in the molecule together with the PVA based polymers (PVA-1) and (PVA-2).

As the method of obtaining the synthetic resin powder (A) by drying the composition composed mainly of the aqueous emulsion (EM) and the PVA based polymer (PVA-2), spray drying is preferable. As spray drying, ordinary spray drying to dry by spraying a fluid can be used. Depending on the spray mode, a disc mode, a nozzle mode and an impulse wave mode are available, and any of the modes may be employed. As a heat source of the drying, hot air and heated water vapor are used. A drying condition may be appropriately selected depending on the size and the type of a spray dryer, the concentration, the viscosity and the flow of the composition to be dried. A drying temperature is appropriately 100 to 150°

C., and it is desirable to set up other drying conditions so that the sufficiently dried powder is obtained in this drying temperature range. An average particle diameter of the synthetic resin powder (A) is typically adjusted to 10 to 150 μm by the above various conditions.

The inorganic powder (B) is not particularly limited as long as it does not impair the performance of the present invention, and for example, calcium carbonate, calcium magnesium carbonate, clay, silic acid anhydrate, aluminium silicate, white carbon, talc and alumina white can be used. Among them, calcium carbonate is particularly preferable in terms of performance and economic efficiency. The inorganic powder has the functions of the blocking prevention between the powder particles and water redispersibility enhancement of the synthetic resin powder (A), and mechanical strength enhancement of the adhesive agent layer and a coating agent layer in the adhesive agent and coating agent of the present invention. By this meaning, it is preferable that the average particle diameter of the inorganic powder is 0.1 to 100 μm.

Such an inorganic powder may be added to the synthetic resin powder after (spray) drying, and mixed uniformly, but they may be dried and mixed simultaneously by drying the composition composed mainly of the aqueous emulsion (EM) and the PVA based polymer (PVA-2) in the presence of the inorganic powder.

Various additives may be added to the resulting mixed powder (C) in the range in which the performance is not impaired. Such additives include powders of thermosetting resins such as urea resins, melamine resins and phenol resins, starches such as wheat flour, corn starch and rice flour, fibers such as wood powder, walnut shell powder and coconut shell powder, organic powders of proteins such as soybean powder, casein and blood meal, powdery anti-foams, preservatives, insect repellents and coloring agents.

The polyvalent isocyanate compound combined with the synthetic resin powder (A) and the inorganic powder (B) has two or more isocyanate groups in the molecule, and includes, for example, trilene diisocyanate (TDI), hydrogenated TDI, trimethylolpropane-TDI adduct (e.g., brand name Desmodur L supplied from Bayer), triphenylmethane triisocyanate, methylenebisdiphenyl isocyanate (MDI), hydrogenated MDI, polymerized MDI, hexamethylene diisocyanate, xylylene diisocyanate, 4,4-dicyclohexylmethane diisocyanate and isophorone diisocyanate. Additionally, a prepolymer where a terminal group previously polymerized with excessive polyisocyanate has the isocyanate groups in polyol may be used. These may be used alone or in combination of two or more.

Among them, polymerized MDI (also referred to as polymeric MDI or PMDI) is preferable in terms of economic efficiency. As the polyvalent isocyanate compound, it is also possible to use water dispersion types made by giving ionic modification or adding the surfactant in the range in which the performance is not impaired, and for example, those in which a plasticizer such as dibutyl phthalate or a solvent has been combined.

The adhesive composition of the present invention is composed of the synthetic resin powder (A), the inorganic powder (B) and the polyvalent isocyanate compound. It is preferable in terms of workability and easy preparation and management at the work site that the mixed powder (C) is previously prepared from the synthetic resin powder (A) and the inorganic powder (B) and the polyvalent isocyanate compound is combined with the mixed powder (C). The ratio of the mixed powder (C) to the polyvalent isocyanate compound to be combined may be appropriately selected depending on various circumstances. However, when the amount of the polyvalent isocyanate compound is too small, the physical property such as water resistant adhesiveness is not sometimes exhibited sufficiently, and when it is too large, the cost is increased and the workability as well tends to worsen. Thus, the amount of the polyvalent isocyanate compound is preferably 3 to 100 parts by weight and more preferably 5 to 50 parts by weight relative to 100 parts by weight of the mixed powder (C) in terms of solid content.

The adhesive composition of the present invention is used in various methods depending on the circumstance and adherends. For example, a usage in which the mixed powder (c) is mixed with wood pieces to previously make the wood pieces to which the mixed powder with a small amount of water has been accreted and subsequently the polyvalent isocyanate compound is further mixed and pressed to give a molded product where the wood pieces have been adhered is available. However, the method in which the polyvalent isocyanate compound is mixed with water in which the mixed powder (C) has been redispersed to use as the adhesive agent or coating agent is more effective and preferable.

The adhesive compound of the present invention is used for the adhesion or coating of various adherends, and particularly is suitable for the adhesion or coating of woods. The amount of the adhesive composition to be applied is preferably 20 to 300 g/m$^2$ and more preferably 30 to 200 g/m$^2$ in terms of solid content. An application method includes coating with a brush and coating by roll. Drying after the application may be the drying at room temperature to 200° C. with heating, and sufficient performance is exhibited even by drying at room temperature. A drying time period after the application is preferably about 30 minutes to 5 hours. When the adhesive composition of the present invention is used as the adhesive agent, it is preferable to dry in a state of closing joint. A pressure upon the closing joint is selected from the range of 5 to 20 kg/cm$^2$. When the hard wood is the adherend, it is preferable that the pressure upon the closing joint is higher, whereas when the soft wood is the adherend, high pressure not to break the wood is preferable.

Specific intended uses of the adhesive composition of the present invention as the adhesive agent and coating agent are not limited, and the adhesive composition is used as adhesive agents for wooden products such as laminated timber, plywood laminates and household furniture, the adhesive agents for wood and a dissimilar material, e.g., wood/plastic and wood/metal, and primer coating agents for concrete panels. Hereinafter, the present invention will be described more specifically with reference to Examples and Comparative Examples, but the present invention is not limited thereto. In Examples and Comparative Examples, the "part" and "%" are represented based on the weight unless otherwise specified.

PRODUCTION EXAMPLE-1 OF AQUEOUS EMULSION

In a pressure-proof autoclave equipped with a nitrogen inlet and a thermometer, 80 parts of an aqueous solution of 5% PVA (a) (unmodified PVA having a polymerization degree of 800 and a saponification degree of 88 mol %, amount of 1,2-glycol linkage: 1.6 mol %) was placed, and 0.5 parts of sodium acetate was further added. Then 80 parts of vinyl acetate was added and the temperature was raised to 60° C. to perform the substitution with nitrogen. Subsequently, ethylene was added with pressure up to 45 kg/cm$^2$ (gauge pressure), and 5 parts of an aqueous solution of 5% sodium tartrate was added. Then, an aqueous solution of 0.4% hydrogen peroxide was continuously added to initiate the polymerization. After 3 hours, a concentration of vinyl acetate became 0.9% and the polymerization was terminated to yield an ethylene-vinyl acetate copolymer emulsion having a solid content concentration of 55.0% and a viscosity of 2000 mPa·s (ethylene content: 20% by weight, EM-1).

PRODUCTION EXAMPLE-1 OF MIXED POWDER

A mixture obtained by mixing the emulsion (EM-1) produced in Production Example-1 of aqueous emulsion with the aqueous solution of 15% PVA (b) (unmodified PVA having the polymerization degree of 500 and the saponification degree of 88 mol %, amount of 1,2-glycol linkage: 1.6 mol %) so that a solid content weight ratio was 100/10 was sprayed and dried in hot air at 140° C. using a spray dryer (L-8 type supplied from Ohkawara Kakohki Co., Ltd.) to yield a synthetic resin powder having an average particle diameter of 25 μm. Then, 150 parts by weight of heavy calcium carbonate (average particle diameter: 3.4 μm, supplied from Maruo Calcium Co., Ltd.) was added to 100 parts by weight of the synthetic resin powder, which was then mixed thoroughly to yield a mixed powder.

EXAMPLE 1

100 parts by weight of ion exchange water was added to 100 parts by weight of the mixed powder obtained in Production Example-1 of mixed powder, and the mixture was stirred using a stirrer to redisperse. The redispersibility of a powder composition is determined by the following criteria. Also, 30 parts (15 parts by weight relative to 100 parts by weight of mixed powder) of polymeric MDI (MR-200 supplied from Nippon Polyurethane Industry Co., Ltd.) was added to and mixed with 200 parts by weight of the redispersed powder composition to prepare an adhesive agent, and a test shown below was performed. Composition ratios of the adhesive composition are shown in Table 1 and results of the test are shown in Table 2.

Redispersibility of Mixed Powder

A state when the ion exchange water was added to the mixed powder, which was redispersed was observed, and the redispersibility was evaluated by the following criteria.

○: being clearly dispersed and no aggregate was observed visually;

Δ: being dispersed but the aggregates (non-dispersed matters) were observed visually; and X: not being dispersed.

Performance as Adhesive Agent (or Coating Agent)

When a specific amount of the isocyanate compound was added to and mixed with the redispersed mixed powder to prepare the adhesive agent, a viscosity change, a foaming property and a wood adhesive force were evaluated according to the following.

Viscosity change: A viscosity increase magnification (based on the viscosity immediately after mixing the isocyanate compound) immediately after, 30 minutes and 60 minutes after mixing the isocyanate compound was measured at 20° C. using a B type viscometer.

Viscosity increase magnification=(Viscosity after $x$ minutes)/(Viscosity immediately after mixing the isocyanate compound)

Foaming property: The adhesive agent immediately after mixing the isocyanate compound was placed in a graduated cylinder, and an increased amount of a volume after 30 and 60 minutes was measured to calculate a foaming magnification at 20° C.

Foaming magnification=(Volume after $x$ minutes)/(Volume immediately after mixing the isocyanate compound)

Wood adhesive force: [Adhesion condition]

Adherend: birch/birch (radial cut) water content: 8%

Applied amount: 250 g/m² (applied on both sides)

Deposition time: one minute

Closing joint condition: 20° C. 24 hours, pressure 10 kg/cm² [Measurement condition] A compression shearing adhesion strength by JIS K-6852 was measured.

Ordinary state strength: The strength was directly measured after leaving at 20° C. for 7 days.

Repeated boiling: After leaving at 20° C. for 7 days, a test piece was immersed in boiled water for 4 hours, subsequently dried in air at 60° C. for 20 hours, further immersed in boiled water for 4 hours, then immersed in water at room temperature until being cooled, and the piece in a wetted state was subjected to the test.

COMPARATIVE EXAMPLE 1

The test was performed in the same way as in Example 1, except that a powder composition was made without adding heavy calcium carbonate at all in Production Example-1 of mixed powder. The results are shown in Table 2.

COMPARATIVE EXAMPLE 2

The test was performed in the same way as in Example 1, except that a powder composition was made using 400 parts by weight of heavy calcium carbonate in Production Example-1 of mixed powder. The results are shown in Table 2.

COMPARATIVE EXAMPLE 3

The test was performed in the same way as in Example 1, except that polymeric MDI was not used in Example 1. The results are shown in Table 2.

COMPARATIVE EXAMPLE 4

A powder composition was made in the same way as in Production Example-1 of mixed powder except that those obtained by mixing the aqueous emulsion (EM-1) and 15% PVA (b) (unmodified PVA having the polymerization degree of 500 and the saponification degree of 88 mol %, amount of 1,2-glycol linkage: 1.6 mol %) so that the solid content weight ratio was 100/30 was used in Production Example-1 of mixed powder, and the test was performed in the same way as in Example 1. The results are shown in Table 2.

EXAMPLE 2

A mixed powder was produced in the same way as in Production Example-1 of mixed powder except that 15% PVA (b) (unmodified PVA having the polymerization degree of 500 and the saponification degree of 88 mol %, amount of 1,2-glycol linkage: 1.6 mol %) was not used in Production Example-1 of mixed powder, and the test was performed in the same way as in Example 1. The results are shown in Table 2.

EXAMPLE 3

A mixed powder was produced in the same way as in Production Example-1 of mixed powder except that PVA (c)

(unmodified PVA having the polymerization degree of 800 and the saponification degree of 88 mol %, amount of 1,2-glycol linkage: 2.2 mol %) was used in place of PVA (b) in Production Example-1 of mixed powder, and the test was performed in the same way as in Example 1. The results are shown in Table 2.

EXAMPLE 4

A mixed powder was produced in the same way as in Production Example-1 of mixed powder except that PVA (d) (polymerization degree of 1300 and saponification degree of 93 mol %, modification amount derived from ethylene unit: 2.5 mol %) was used in place of PVA (b) in Production Example-1 of mixed powder, and the test was performed in the same way as in Example 1. The results are shown in Table 2.

EXAMPLE 5

A mixed powder was produced in the same way as in Production Example-1 of mixed powder except that PVA (e) (polymerization degree of 1800 and saponification degree of 86 mol %, modification amount of itaconic acid: 1.2 mol %) was used in place of PVA (b) in Production Example-1 of mixed powder, and the test was performed in the same way as in Example 1. The results are shown in Table 2.

EXAMPLE 6

An ethylene vinyl acetate N-methylol acrylamide copolymer emulsion (EM-2) having the solid content concentration of 54.9% and the viscosity of 3000 mPa·s was produced in the same way as in Production Example-1 of aqueous emulsion except that 70 parts of vinyl acetate and one part of N-methylol acrylamide were used in place of 80 parts of vinyl acetate in Production Example-1 of aqueous emulsion. A mixed powder was produced in the same way as in Production Example-1 of mixed powder except that EM-2 was used in place of EM-1 in Production Example-1 of mixed powder, and the test was performed in the same way as in Example 1. The results are shown in Table 2.

EXAMPLE 7

A mixed powder was produced in the same way as in Production Example-1 of mixed powder except that 100 parts of talc (NK supplied from Fuji Talc Industrial Co., Ltd.) was used in place of heavy calcium carbonate in Production Example-1 of mixed powder, and the test was performed in the same way as in Example 1. The results are shown in Table 2.

COMPARATIVE EXAMPLE 5

An ethylenevinyl acetate copolymer emulsion (EM-3) having the solid content concentration of 54.9% and the viscosity of 350 mPa·s was produced in the same way as in Production Example-1 of aqueous emulsion except that a nonionic surfactant (Nanoacty N-100 supplied from Sanyo Chemical Industries Ltd.) was used in place of PVA (a) in Production Example-1 of aqueous emulsion. A mixed powder was produced in the same way as in Production Example-1 of mixed powder except that EM-3 was used in place of EM-1 in Production Example-1 of mixed powder, and the test was performed in the same way as in Example 1. The results are shown in Table 2.

EXAMPLE 8

An ethylene vinyl acetate copolymer emulsion (EM-4) having the solid content concentration of 55.2% and the viscosity of 3200 mPa·s was produced in the same way as in Production Example-1 of aqueous emulsion except that 80 parts by weight of the aqueous solution of 6.25% blend of PVA (e) (polymerization degree of 1800 and saponification degree of 86 mol %, modification amount of itaconic acid: 1.2 mol %) and PVA(f) (polymerization degree of 600 and saponification degree of 75 mol %, modification amount of itaconic acid: 1.0 mol %) at a weight ratio of 40/60 was used in place of PVA (a) in Production Example-1 of aqueous emulsion. A mixed powder was produced in the same way as in Production Example-1 of mixed powder except that EM-4 was used in place of EM-1 in Production Example-1 of mixed powder, and the test was performed in the same way as in Example 1. The results are shown in Table 2.

PRODUCTION EXAMPLE-2 OF AQUEOUS EMULSION

In a glass polymerization container equipped with a reflux condenser, a dropping funnel, a thermometer and a nitrogen inlet, 112.5 parts by weight of the aqueous solution of 8% PVA (g) (unmodified PVA having the polymerization degree of 500 and the saponification degree of 96 mol %, amount of 1,2-glycol linkage: 2.3 mol %) was placed, 10 parts of methyl methacrylate and 10 parts of n-butyl acrylate were added thereto, and after the substitution with nitrogen, the temperature was raised to 60° C. Then, 2 parts of the aqueous solution of 2% ammonium persulfate was added to initiate the polymerization, and further 40 parts of methyl methacrylate, 38 parts of n-butyl acrylate and 2 parts of 2-hydroxyethyl acrylate were added continuously over 2 hours. The polymerization was terminated in 3 hours to yield a stable methyl methacrylate-n-butyl acrylate-acrylate-2-hydroxyethyl copolymer emulsion (EM-5) having the solid content concentration of 50.4% and the viscosity of 1200 mPa·s.

EXAMPLE 9

A mixed powder was produced in the same way as in Production Example-1 of mixed powder except that EM-5 obtained in Production Example-2 of aqueous emulsion was used in place of EM-1 in Production Example-1 of mixed powder. Then, 100 parts by weight of ion exchange water was added to 100 parts by weight of the obtained mixed powder, which was stirred and redispersed using a stirrer. The results of observing the redispersed state are shown in Table 2. Also, 20 parts (10 parts by weight relative to 100 parts by weight of mixed powder) of polymeric MDI (MR-200 supplied from Nippon Polyurethane Industry Co., Ltd.) was added to and mixed with 200 parts by weight of the redispersed powder composition to prepare an adhesive agent, and the test shown below was performed. The results are shown in Table 2.

PRODUCTION EXAMPLE-3 OF AQUEOUS EMULSION

In the glass polymerization container equipped with the reflux condenser, the dropping funnel, the thermometer and the nitrogen inlet, 112.5 parts by weight of the aqueous solution of 8% PVA (h) (polymerization degree of 1700 and saponification degree of 98 mol %, modification amount derived from ethylene unit: 6 mol %) was placed, 10 parts of vinyl acetate was added thereto, and after the substitution with nitrogen, the temperature was raised to 60° C. Then, 10 parts by weight of the aqueous solution of 5% tartaric acid was added, and 20 parts by weight of 1% hydrogen peroxide was continuously added over 3 hours, and further 90 parts of vinyl acetate was continuously added for 2 hours. The polymerization was terminated in 3 hours to yield a stable polyvinyl acetate emulsion (EM-6) having the solid content concentration of 44.8% and the viscosity of 6500 mPa·s.

EXAMPLE 10

A mixed powder was produced in the same way as in Production Example-1 of mixed powder except that EM-6 obtained in Production Example-3 of aqueous emulsion was used in place of EM-1 in Production Example-1 of mixed powder. Then, 100 parts by weight of ion exchange water was added to 100 parts by weight of the obtained mixed powder, which was stirred and redispersed using a stirrer. The results of observing the redispersed state are shown in Table 2. Also, 50 parts (25 parts by weight relative to 100 parts by weight of mixed powder) of polymeric MDI (MR-200 supplied from Nippon Polyurethane Industry Co., Ltd.) was added to and mixed with 200 parts by weight of the redispersed mixed powder to prepare an adhesive agent, and the test shown below was performed. The results are shown in Table 2.

PRODUCTION EXAMPLE-4 OF AQUEOUS EMULSION

In the pressure-proof autoclave equipped with the nitrogen inlet and the thermometer, 120 parts of the aqueous solution of 10.8% PVA (i) (polymerization degree: 300, saponification degree: 90 mol %, modified with mercapto group at one terminus) was placed, pH was adjusted to 4.0 with sulfuric acid, and then 60 parts of styrene was placed. Then, 40 parts of butadiene was added with pressure using a pressure-proof meter, and the temperature was raised to 70° C. Subsequently, 25 parts of the aqueous solution of 2% potassium persulfate was added with pressure to initiate the polymerization. An inner pressure was decreased from 4.8 kg/cm$^2$ with progress of the polymerization to 0.5 kg/cm$^2$ after 20 hours, and at this time point, the polymerization was terminated to yield a stable styrene-butadiene copolymer emulsion (EM-7) having the solid content concentration of 45.5% and the viscosity of 900 mPas·s.

EXAMPLE 11

A mixed powder was produced in the same way as in Production Example-1 of mixed powder except that EM-7 obtained in Production Example-4 of aqueous emulsion was used in place of EM-1 in Production Example-1 of mixed powder, and the test was performed in the same way as in Example 1. The results are shown in Table 2.

COMPARATIVE EXAMPLES 6 TO 7, EXAMPLE 12, COMPARATIVE EXAMPLE 8

A mixed powder was produced in the same way as in Production Example-1 of mixed powder except that 20 parts by weight, 40 parts by weight, 60 parts by weight or 260 parts by weight of heavy calcium carbonate was added to 100 parts by weight of the synthetic resin powder in Production Example-1 of mixed powder, and an adhesive agent was prepared in the same way as in Example 1 (each Comparative Examples 6 to 7, Example 12, Comparative Example 8). Composition ratios of the adhesive composition are shown in Table 1, and results of the test performed likewise are shown in Table 2.

EXAMPLE 13

An ethylene-vinyl acetate-N-methylol acrylamide copolymer emulsion (EM-8) having a solid content concentration of 52% and a viscosity of 1100 mPa·s was produced by using PVA (g) in place of PVA (a) in Production Example-1 of aqueous emulsion and using 70 parts of vinyl acetate and one part of N-methylol acrylamide in place of 80 parts of vinyl acetate in Production Example-1 of aqueous emulsion as a dispersoid. A mixed powder was produced in the same way as in Production Example-1 of mixed powder except that EM-8 was used in place of EM-1 in Production Example-1 of mixed powder. The test was performed using PVA (e) as the PVA based polymer (PVA-2) in the same way as in Example 1. The results are shown in Table 2.

EXAMPLE 14

The test was performed using PVA(g) as the PVA based polymer (PVA-2) in Example 13 in the same way as in Example 1. The results are shown in Table 2.

TABLE 1

| | Mixed powder (C) | | | | | |
|---|---|---|---|---|---|---|
| | Synthetic resin powder (A) | | | | | Polyvalent |
| | Aqueous emulsion (EM) *1 | | | | | isocyanate |
| | Dispersant (PVA-1) | Monomer | PVA-2 *2 | Inorganic powder (B) *3 | | compound *4 |
| Example 1 | PVA (a) (4) | VAM (80), Et (20) | PVA (b) (10) | Calcium carbonate (150) | | PMDI (15) |
| Comparative Example 1 | PVA (a) (4) | VAM (80), Et (20) | PVA (b) (10) | — | | PMDI (15) |
| Comparative Example 2 | PVA (a) (4) | VAM (80), Et (20) | PVA (b) (10) | Calcium carbonate (400) | | PMDI (15) |
| Comparative Example 3 | PVA (a) (4) | VAM (80), Et (20) | PVA (b) (10) | Calcium carbonate (150) | | — |
| Comparative Example 4 | PVA (a) (4) | VAM (80), Et (20) | PVA (b) (30) | Calcium carbonate (150) | | PMDI (15) |
| Example 2 | PVA (a) (4) | VAM (80), Et (20) | — | Calcium carbonate (150) | | PMDI (15) |
| Example 3 | PVA (a) (4) | VAM (80), Et (20) | PVA (c) (10) | Calcium carbonate (150) | | PMDI (15) |
| Example 4 | PVA (a) (4) | VAM (80), Et (20) | PVA (d) (10) | Calcium carbonate (150) | | PMDI (15) |
| Example 5 | PVA (a) (4) | VAM (80), Et (20) | PVA (e) (10) | Calcium carbonate (150) | | PMDI (15) |
| Example 6 | PVA (a) (4) | VAM (79), Et (20), N-MAM (1) | PVA (b) (10) | Calcium carbonate (150) | | PMDI (15) |
| Example 7 | PVA (a) (4) | VAM (80), Et (20) | PVA (b) (10) | Talc (100) | | PMDI (15) |
| Comparative Example 5 | Surfactant (j) (4) | VAM (80), Et (20) | PVA (b) (10) | Calcium carbonate (150) | | PMDI (15) |
| Example 8 | PVA (e) (2), PVA (f) (3) | VAM (80), Et (20) | PVA (b) (10) | Calcium carbonate (150) | | PMDI (15) |
| Example 9 | PVA (g) (9) | MMA (50), BA (48), HEA (2) | PVA (b) (10) | Calcium carbonate (150) | | PMDI (10) |

TABLE 1-continued

| | Mixed powder (C) | | | | | Polyvalent isocyanate compound *4 |
|---|---|---|---|---|---|---|
| | Synthetic resin powder (A) | | | | | |
| | Aqueous emulsion (EM) *1 | | | | | |
| | Dispersant (PVA-1) | Monomer | PVA-2 *2 | Inorganic powder (B) *3 | | |
| Example 10 | PVA (h) (9) | VAM (100) | PVA (b) (10) | Calcium carbonate (150) | | PMDI (25) |
| Example 11 | PVA (i) (13) | ST (60), BD (40) | PVA (b) (10) | Calcium carbonate (150) | | PMDI (15) |
| Comparative Example 6 | PVA (a) (4) | VAM (80), Et (20) | PVA (b) (10) | Calcium carbonate (20) | | PMDI (15) |
| Comparative Example 7 | PVA (a) (4) | VAM (80), Et (20) | PVA (b) (10) | Calcium carbonate (40) | | PMDI (15) |
| Example 12 | PVA (a) (4) | VAM (80), Et (20) | PVA (b) (10) | Calcium carbonate (60) | | PMDI (15) |
| Comparative Example 8 | PVA (a) (4) | VAM (80), Et (20) | PVA (b) (10) | Calcium carbonate (260) | | PMDI (15) |
| Example 13 | PVA (g) (4) | VAM (79), Et (20), N-MAM (1) | PVA (e) (10) | Calcium carbonate (150) | | PMDI (15) |
| Example 14 | PVA (g) (4) | VAM (79), Et (20), N-MAM (1) | PVA (g) (10) | Calcium carbonate (150) | | PMDI (15) |
| Example 15 | PVA (a) (4) | VAM (80), Et (20) | PVA (g) (10) | Calcium carbonate (150) | | PMDI (15) |

*1 Numbers in parentheses denote parts by weight.
*2 Numbers in parentheses denote parts by weight relative to 100 parts by weight of the solid content in the aqueous emulsion.
*3 Numbers in parentheses denote parts by weight relative to 100 parts by weight of (A).
*4 Numbers in parentheses denote parts by weight relative to 100 parts by weight of the mixed powder (C).
PVA (a) Polymerization degree: 800, saponification degree: 88 mol %, unmodified PVA, amount of 1,2-glycol linkage: 1.6 mol %;
PVA (b) Polymerization degree: 500, saponification degree: 88 mol %, unmodified PVA, amount of 1,2-glycol linkage: 1.6 mol %;
PVA (c) Polymerization degree: 800, saponification degree: 88 mol %, unmodified PVA, amount of 1,2-glycol linkage: 2.2 mol %;
PVA (d) Polymerization degree: 1300, saponification degree: 93 mol %, modification amount derived from ethylene unit: 2.5 mol %;
PVA (e) Polymerization degree: 1800, saponification degree: 86 mol %, modification amount of itaconic acid: 1.2 mol %;
PVA (f) Polymerization degree: 600, saponification degree: 75 mol %, modification amount of itaconic acid: 1.0 mol %;
PVA (g) Polymerization degree: 500, saponification degree: 96 mol %, unmodified PVA, amount of 1,2-glycol linkage: 2.3 mol %;
PVA (h) Polymerization degree: 1700, saponification degree: 98 mol %, modification amount derived from ethylene unit: 6 mol %;
PVA (i) Polymerization degree: 300, saponification degree: 90 mol %, modified with mercapto group at one terminus.
Calcium carbonate: Heavy calcium carbonate (Maruo Calcium Co., Ltd., average particle diameter: 3.4 μm)
Surfactant (j): polyoxyalkylene alkyl ether (Nanoacty N-100 supplied from Sanyo Chemical Industries Ltd.)
VAM: vinyl acetate
Et: ethylene
St: styrene
BD: butadiene
N-MAM: N-methylol acrylamide
MMA: methyl methacrylate
BA: n-butyl acrylate
HEA: 2-hydroxyethyl acrylate
PMDI: polymeric MDI (MR-200 supplied from Nippon Polyurethane Industry Co., Ltd.)
Talc: NK supplied from Fuji Talc Industrial Co., Ltd.

TABLE 2

| | Performance as adhesive agent (coating agent) | | | | | | |
|---|---|---|---|---|---|---|---|
| | Performance of mixed powder | Viscosity increase magnification (times) | | Foaming magnification | | Wood adhesive force (kg/cm$^2$) | |
| | Redispersibility | After 30 minutes | After 60 minutes | After 30 minutes | After 60 minutes | Ordinary state strength | Repeated boiling |
| Example 1 | ○ | 1.2 | 1.4 | 1.8 | 2.0 | 180 | 90 |
| Comparative Example 1 | Δ | 1.2 | 1.6 | 2.0 | 2.3 | 100 | 40 |
| Comparative Example 2 | x | 1.5 | 1.8 | 2.3 | 2.6 | 120 | 20 |
| Comparative Example 3 | ○ | 1.0 | 1.0 | 1.0 | 1.0 | 80 | 0 |
| Comparative Example 4 | ○ | 1.3 | 1.5 | 2.0 | 2.3 | 160 | 20 |
| Example 2 | ○ | 1.2 | 1.4 | 1.7 | 1.9 | 170 | 70 |
| Example 3 | ○ | 1.1 | 1.3 | 1.7 | 1.9 | 180 | 85 |
| Example 4 | ○ | 1.3 | 1.5 | 1.9 | 2.2 | 180 | 90 |
| Example 5 | ○ | 1.4 | 1.6 | 2.0 | 2.2 | 190 | 90 |
| Example 6 | ○ | 1.4 | 1.7 | 2.1 | 2.3 | 190 | 100 |
| Example 7 | ○ | 1.3 | 1.5 | 1.9 | 2.2 | 170 | 70 |
| Comparative Example 5 | x | 3.5 | 6.0 | 4.1 | 5.5 | 130 | 60 |
| Example 8 | ○ | 1.1 | 1.3 | 1.8 | 1.9 | 185 | 85 |
| Example 9 | ○ | 1.3 | 1.5 | 1.9 | 2.0 | 190 | 110 |
| Example 10 | ○ | 1.5 | 1.7 | 2.0 | 2.2 | 170 | 65 |
| Example 11 | ○ | 1.3 | 1.6 | 1.9 | 2.3 | 180 | 90 |
| Comparative Example 6 | Δ | 1.2 | 1.6 | 2.0 | 2.4 | 110 | 40 |
| Comparative Example 7 | Δ | 1.2 | 1.5 | 2.0 | 2.4 | 110 | 40 |
| Example 12 | ○ | 1.2 | 1.4 | 1.9 | 2.2 | 160 | 75 |
| Comparative Example 8 | Δ | 1.5 | 1.7 | 2.2 | 2.6 | 120 | 45 |
| Example 13 | ○ | 1.1 | 1.3 | 1.6 | 1.8 | 195 | 115 |

TABLE 2-continued

|  | Performance of mixed powder | Performance as adhesive agent (coating agent) | | | | | |
|---|---|---|---|---|---|---|---|
|  |  | Viscosity increase magnification (times) | | Foaming magnification | | Wood adhesive force (kg/cm$^2$) | |
|  | Redispersibility | After 30 minutes | After 60 minutes | After 30 minutes | After 60 minutes | Ordinary state strength | Repeated boiling |
| Example 14 | ○ | 1.1 | 1.3 | 1.7 | 1.9 | 210 | 125 |
| Example 15 | ○ | 1.2 | 1.4 | 1.7 | 1.9 | 190 | 100 |

INDUSTRIAL APPLICABILITY

The adhesive agent and the coating agent of the present invention are excellent in handling property and storage stability as well as excellent in high water resistance and redispersibility, and thus, are suitable as an adhesive agent and a coating agent.

The invention claimed is:

1. An adhesive composition, comprising:
a synthetic resin powder (A) obtained by drying an aqueous emulsion (EM) comprising a polyvinyl alcohol polymer (PVA-1) in which a polymer having at least one monomer unit selected from the group consisting of ethylenically unsaturated monomers and diene monomers is dispersed;
an inorganic powder (B); and
a polyvalent isocyanate compound;
wherein a weight ratio of (A)/(B) is from 100/50 to 100/250.

2. The adhesive composition according to claim 1, wherein the polyvinyl alcohol polymer (PVA-1) comprises at least one member selected from the group consisting of:
an unmodified polyvinyl alcohol having a polymerization degree of 200 to 2,000 and a saponification degree of 80 to 96 mol %;
a polyvinyl alcohol polymer comprising a carboxyl group;
a polyvinyl alcohol polymer comprising 10 mol % or less of a monomer unit derived from an α-olefin having 2 to 4 carbon atoms;
a polyvinyl alcohol polymer comprising 1.7 mol % or more of 1,2-glycol linkage in a molecule; and
a polyvinyl alcohol polymer comprising a mercapto group at a terminus.

3. The adhesive composition according to claim 1, wherein the aqueous emulsion (EM) is an emulsion obtained by emulsion polymerization of a monomer comprising a primary hydroxyl group.

4. The adhesive composition according to claim 1, wherein the synthetic resin powder is a synthetic resin powder obtained by drying a composition obtained by combining a polyvinyl alcohol polymer (PVA-2) with the aqueous emulsion (EM).

5. The adhesive composition according to claim 4, wherein the polyvinyl alcohol polymer (PVA-2) is combined with the aqueous emulsion (EM) in an amount of 1 to 25 parts by weight of the polyvinyl alcohol polymer (PVA-2) based on 100 parts by weight of a solid content of the aqueous emulsion (EM).

6. The adhesive composition according to claim 4, wherein the polyvinyl alcohol polymer (PVA-2) comprises at least one member selected from the group consisting of:
an unmodified polyvinyl alcohol having a polymerization degree of 200 to 2,000 and a saponification degree of 80 to 96 mol %;
a polyvinyl alcohol polymer comprising a carboxyl groups;
a polyvinyl alcohol polymer comprising 10 mol % or less of a monomer unit derived from an α-olefin having 2 to 4 carbon atoms; and
a polyvinyl alcohol polymer comprising 1.7 mol % or more of 1,2-glycol linkage in a molecule.

7. The adhesive composition according to claim 4, wherein the polyvinyl alcohol polymer (PVA-1) and/or (PVA-2) comprises the polyvinyl alcohol polymer having 1.7 mol % or more of 1,2-glycol linkage in the molecule.

8. The adhesive composition according to claim 1, wherein the composition is obtained by combining the polyvalent isocyanate compound with a mixed powder (C) comprising the synthetic resin powder (A) and the inorganic powder (B).

9. The adhesive composition according to claim 8, wherein the mixed powder (C) is redispersed in water prior to by combination with the polyvalent isocyanate compound.

10. The adhesive composition according to claim 1, wherein the synthetic resin powder (A) is obtained by spray drying.

11. The adhesive composition according to claim 1, wherein the inorganic powder (B) is calcium carbonate.

12. The adhesive composition according to claim 1, wherein the adhesive composition is an adhesive agent or a coating agent.

* * * * *